US006643423B2

(12) United States Patent
Gruber et al.

(10) Patent No.: US 6,643,423 B2
(45) Date of Patent: Nov. 4, 2003

(54) SYSTEM AND METHOD FOR BRIDGE AND ROLL IN A PHOTONIC SWITCH

(75) Inventors: John G. Gruber, Orleans (CA); Frederick J. Lalonde, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 231 days.

(21) Appl. No.: 09/850,130

(22) Filed: May 8, 2001

(65) Prior Publication Data

US 2002/0168129 A1 Nov. 14, 2002

(51) Int. Cl.[7] .................................................. G02B 6/26
(52) U.S. Cl. ............................. 385/16; 385/17; 385/18; 398/130; 398/119
(58) Field of Search ............................. 385/16, 17, 18, 385/19, 20–24; 359/139, 128, 123, 117; 398/130, 119, 114, 108

(56) References Cited

U.S. PATENT DOCUMENTS 6,370,295 B2 * 4/2002 Lebouette et al. ............ 385/17

* cited by examiner

Primary Examiner—Phan T. H. Palmer (57) ABSTRACT

A bridge and roll method for doing an in-service switch (less than 50 ms) from one set of inputs and outputs on a primary photonic switch to another set of inputs and outputs on the same or a secondary photonic switch. The bridge and roll method facilitates maintenance, repairs and upgrades on the primary photonic switch. The bridge and roll method may be reversed in order to restore the original inputs and outputs on the primary photonic switch after maintenance, repairs or upgrades have been performed. The invention also provides a method for consolidating multiple wavelengths or multiple bands into single fibers.

22 Claims, 9 Drawing Sheets

SYSTEM AND METHOD FOR BRIDGE AND ROLL IN A PHOTONIC SWITCH

FIELD OF THE INVENTION

This invention relates to photonic switch systems.

BACKGROUND OF THE INVENTION

The demand for high-speed communication networks has increased dramatically over the last few years. In many situations, communication networks are implemented with electrical interconnections. As desired levels of bandwidth and transmission speed for communication networks increase, it will become more difficult for electrical interconnections to satisfy these levels.

Optical fiber offers a solution to the difficulties affecting conventional electrical interconnections. For example, optical fiber is less susceptible to inductive or capacitive coupling effects than are electrical interconnections. Optical fiber also offers increased bandwidth and substantial avoidance of electromagnetic interference. The advantages of optical fiber become more important as the transmission rates increase.

Many communications networks feature hybrid, optical-electrical semiconductor circuits that employ photodetectors, electrical switches, optical modulators and/or lasers. To handle greater data traffic, an alternative approach uses a photonic switch system, which performs switching operations of light pulses or photons (referred to generally as "light signals") without the need for converting and re-converting signals between the optical domain to the electrical domain.

However, conventional photonic switches are still subject to a wide variety of disadvantages. Traditional photonic switch systems may not offer any protective features against equipment failures, specifically failures within the photonic switch itself. Moreover, traditional photonic switches do not provide in service, near hitless, bridge and roll capabilities. Bridge and roll capabilities would be useful for switching from a primary photonic switch to a secondary photonic switch to facilitate maintenance, repair and upgrades on the primary photonic switch.

SUMMARY OF THE INVENTION

In accordance with the present invention there is provided a photonic switch system comprising a first photonic switch having a plurality of inputs and outputs, a second photonic switch having a plurality of inputs and outputs, a plurality of head-end modules each having an input port for receiving incoming light signals, a first output port and a second output port, the first output port being connectable to a respective input of the first photonic switch and the second output port being connectable to a respective input of the second photonic switch, a plurality of tail-end modules each having an output port for transmitting outgoing light signals, a first input port and a second input port, the first input port being connectable to a respective output of the first photonic switch and the second output port being connectable to a respective output of the second photonic switch.

There is further provided a method of performing a bridge and roll operation on incoming optical signals in a photonic switch system having a first photonic switch connected such that an optical path is established only though the first photonic switch, and having a plurality of head-end and tail-end modules and a second photonic switch the method comprising the steps of: connecting a second output port of each module of the plurality of head-end modules to a respective input of the second photonic switch and connecting a second input port of each of the plurality of the tail-end modules to a respective output of the second photonic switch; re-configuring the head-end modules and the tail-end modules so that the incoming light signals that are received on the input ports of the head-end modules are re-routed through the second photonic switch to the output ports of the tail-end modules; and disconnecting a first output port of each head-end module from the first photonic switch and disconnecting a first input port of each tail-end module from the first photonic switch.

The bridge and roll method facilitates protection, maintenance, repair and upgrade of the primary photonic switch.

Advantageously, the bridge and roll method may be reversed in order to restore the original inputs and outputs on the primary photonic switch after protection, maintenance, repair or upgrade has been performed.

The present invention also provides a method for consolidating multiple wavelengths or multiple bands of wavelengths into single fibers.

Other aspects and features of the present invention will become apparent to those ordinarily skilled in the art upon review of the following description of the specific embodiments of the invention in conjunction with the accompanying figures.

DETAILED DESCRIPTION OF THE PREFERRED EMBODIMENTS

Figure 1:
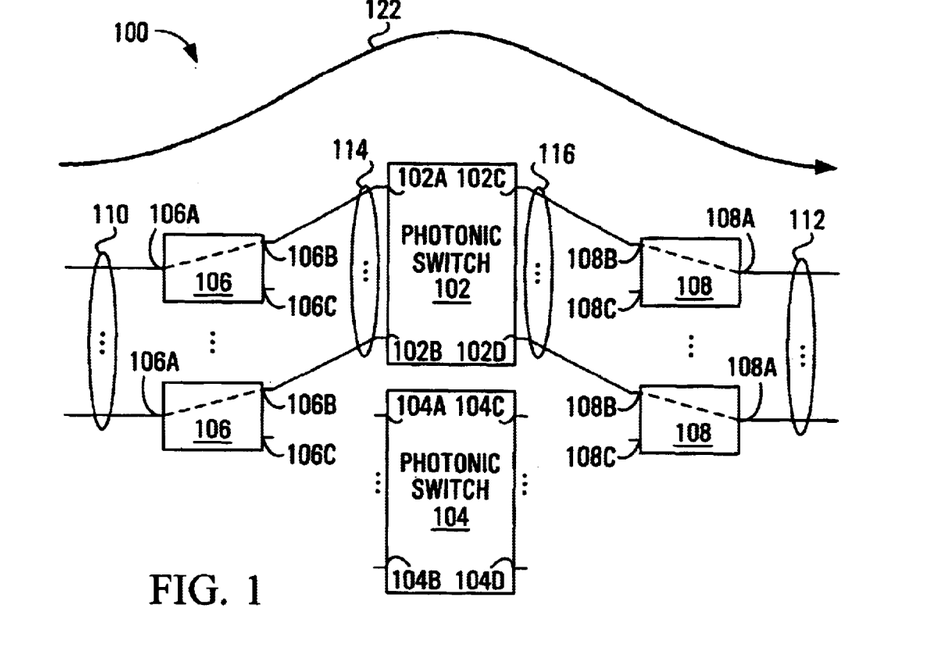
FIG. 1 is a block diagram of a photonic switch system in accordance with a first embodiment of the present invention.

Referring to FIG. 1, there is shown a photonic switch system 100 comprising a plurality of photonic switches shown for convenience as a primary photonic switch 102 having a plurality of inputs 102A,102B and a plurality of outputs 102C,102D, and a secondary photonic switch 104 having a plurality of inputs 104A,104B and a plurality of outputs 104C,104D. It should be appreciated that the primary photonic switch 102 is configured to selectively connect any of its inputs to any of its outputs in known fashion and the secondary photonic switch 104 is similarly configured to connect corresponding inputs to corresponding outputs. The photonic switch system 100 also comprises a plurality of head-end modules 106 each having an input port 106A, a first output port 106B and a second output port 106C, and a plurality of tail-end modules 108 each having an output port 108A, a first input port 108B and a second input port 108C.

The first output port 106B of each head-end module 106 is connected 114 to a respective input 102A,102B of the primary photonic switch 102 and the first input port 108B of each tail-end module 108 is connected 116 to a respective output 102C,102D of the primary photonic switch 102. The number of inputs on the primary photonic switch 102 and the secondary photonic switch 104 may be greater than the number of head-end modules 106. The number of outputs on the primary photonic switch 102 and the secondary photonic switch 104 may be greater than the number of tail-end modules 108. The input port 106A of each head-end module 106 is connectable to a respective input optical fiber 110. The output port 108A of each tail-end module 108 is connectable to a respective output optical fiber 112.

It should be noted that even though the photonic switch system 100 of FIG. 1 is shown configured with a primary photonic switch 102 and a secondary photonic switch 104, it should be understood that the photonic switch system 100 may be configured having one or more primary photonic switches and having one or more secondary photonic switches (that is, an M:N system with M primary photonic switches and N secondary photonic switches where M and N are whole numbers) and still be within the scope of this invention. Furthermore, the photonic switch system 100 may be configured wherein the primary photonic switch 102 and secondary photonic switch 104 are integrated into a single unit. That is, a subset of a single photonic switch (not shown) functions as the primary photonic switch 102 and another subset of the single photonic switch functions as the secondary photonic switch 104.

Although FIG. 1 and other drawings show light signals flowing in only one direction (left to right) for clarity, it should be appreciated that normally an equivalent photonic switch system (not shown) is provided to carry lights signals flowing in the reverse direction (right to left).

Figure 2A:
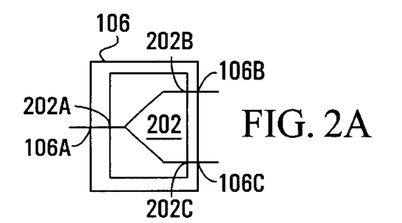
FIGS. 2A, 2B, 2C, 2D and 2E are block diagrams of alternative embodiments of the head-end modules of FIG. 1.

Referring to FIG. 2A, any one of the head-end modules 106 may comprise, for example, a 1:2 splitter 202 having an input 202A, a first output 202B and a second output 202C. The input 202A of the 1:2 splitter 202 is connected to the input port 106A of the head-end module 106. The first output 202B of the 1:2 splitter 202 is connected to the first output port 106B of the head-end module 106. The second output 202C of the 1:2 splitter 202 is connected to the second output port 106C of the head-end module 106.

Figure 2B:
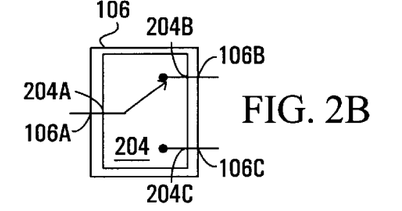

Alternatively, referring to FIG. 2B, any one of the head-end modules 106 may comprise a 1×2 switch 204 having and an input 204A, a first output 204B and a second output 204C. The input 204A of the 1×2 switch 204 is connected to the input port 106A of the head-end module 106. The first output 204B of the 1×2 switch 204 is connected to the first output port 106B of the head-end module 106. The second output 204C of the 1×2 switch 204 is connected to the second output port 106C of the head-end module 106.

Figure 2C:
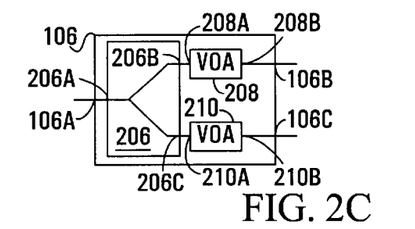

Alternatively, referring to FIG. 2C, any one of the head-end modules 106 may comprise a 1:2 splitter 206 having an input 206A, a first output 206B and a second output 206C, a first variable optical attenuator (VOA) 208 and a second VOA 210—each VOA 208,210 having an input 208A,210A and an output 208B,210B. The input 206A of the 1:2 splitter 206 is connected to the input port 106A of the head-end module 106. The first output 206B of the 1:2 splitter 206 is connected the input 208A of the first VOA 208. The output 208B of the first VOA 208 is connected to the first output port 106B of the head-end module 106. The second output 206C of the 1:2 splitter 206 is connected to the input 210A of the second VOA 210. The output 210B of the second VOA 210 is connected to the second output port 106C of the head-end module 106.

Figure 2D:
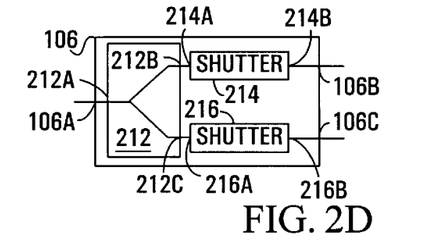

Alternatively, referring to FIG. 2D, any one of the head-end modules 106 may comprise a 1:2 splitter 212 having an input 212A, a first output 212B and a second output 212C, a first shutter 214 and a second shutter 216—each shutter 214,216 having an input 214A,216A and an output 214B, 216B. The topology of this alternative embodiment is the same as the embodiment of FIG. 2C except that each VOA 208,210 is replaced with a shutter 214,216.

Figure 2E:
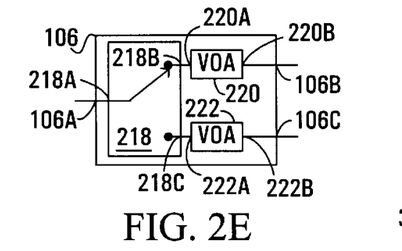

Alternatively, referring to FIG. 2E, any one of the head-end modules 106 may comprise a 1×2 switch 218 having an input 218A, a first output 218B and a second output 218C, a first VOA 220 and a second VOA 222—each VOA 220,222 having an input 220A,222A and an output 220B, 222B. The topology of this alternative embodiment is the same as the embodiment of FIG. 2C except that the splitter 206 is replaced with the 1×2 switch 218.

Figure 3A:
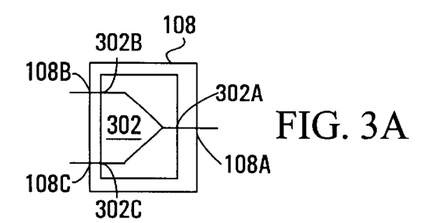
FIGS. 3A, 3B, 3C, 3D, 3E and 3F are block diagrams of alternative embodiments of the tail-end modules of FIG. 1.

Referring to FIG. 3A, any one of the tail-end modules 108 may comprise a 2:1 combiner 302 having an output 302A, a first input 302B and a second input 302C. The output of the 2:1 combiner 302 is connected to the output port 108A of the tail-end module 108. The first input 302B of the 2:1 combiner 302 is connected to the first input port 108B of the tail-end module 108. The second output 302C of the 2:1 combiner 302 is connected to the second input port 108C of the tail-end module 108.

Figure 3B:
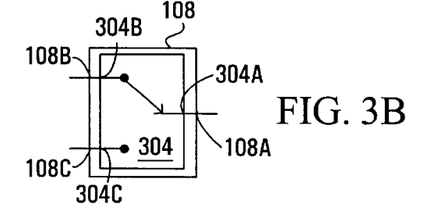

Alternatively, referring to FIG. 3B, any one of the tail-end modules 108 may comprise a 2×1 switch 304 having an output 304A, a first input 304B and a second input 304C. The topology of this alternative embodiment is the same as the embodiment of FIG. 3A except that the combiner 302 is replaced with the 2×1 switch 304.

Figure 3C:
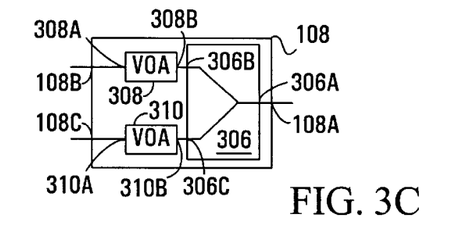

Alternatively, referring to FIG. 3C, any one of the tail-end modules 108 may comprise, for example, a 2:1 combiner 306 having an output 306A, a first input 306B and a second input 306C, a first VOA 308 and a second VOA 310—each VOA 308,310 having an input 308A,310A and an output 308B,310B. The output 306A of the 2:1 combiner 306 is connected to the output port 108A of the tail-end module 108. The first input 306B of the 2:1 combiner 306 is connected to the output 308B of the first VOA 308. The input 308A of the first VOA 308 is connected to the first input port 108B of the tail-end module 108. The second input 306C of the 2:1 combiner 306 is connected to the output 310B of the second VOA 310. The input 310A of the second VOA 310 is connected to the second input port 108C of the tail-end module 108.

Figure 3D:
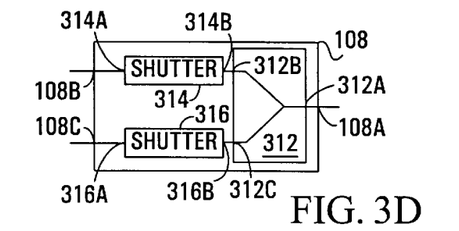

Alternatively, referring to FIG. 3D, any one of the tail-end modules 108 may comprise a 2:1 combiner 312 having an output 312A, a first input 312B and a second input 312C, a first shutter 314 and a second shutter 316—each shutter 314,316 having an input 314A,316A and an output 314B, 316B. The topology of this alternative embodiment is the same as the embodiment of FIG. 3C except that each VOA 308,310 is replaced with a shutter 314,316.

Figure 3E:
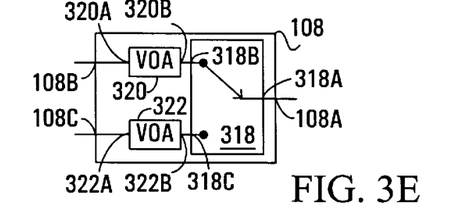

Alternatively, referring to FIG. 3E, any one of the tail-end modules 108 may comprise a 2×1 switch 318 having an output 318A, a first input 318B and a second input 318C, a first VOA 320 and a second VOA 322—each VOA 320,322 having an input 320A,322A and an output 320B,322B. The topology of this alternative embodiment is the same as the embodiment of FIG. 3C except that the combiner 306 is replaced with the 2×1 switch 318.

Figure 3F:
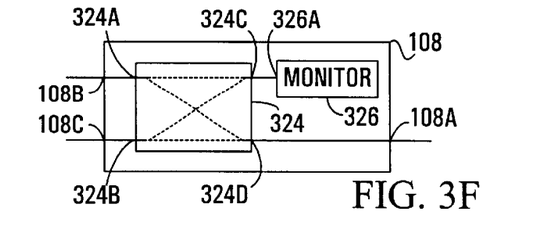

Alternatively, referring to FIG. 3F, any one of the tail-end modules 108 may comprise, for example, a 2×2 switch 324 having a first input 324A, a second input 324B, a first output 324C and a second output 324D, and a performance monitor 326 having an input 326A. The first input 324A of the 2×2 switch 324 is connected to the first input port 108B of the tail-end module 108. The second input 324B of the 2×2 switch 324 is connected to the second input port 108C of the tail-end module 108. The first output 324C of the 2×2 switch 324 is connected to the input 326A of the performance monitor 326. The second output 324D of the 2×2 switch 324 is connected to the output port 108A of the tail-end module 108.

The preferred combinations of head-end modules 106 and tail-end modules 108 are: the head-end module of FIG. 2A and the tail-end module of FIG. 3B; the head-end module of FIG. 2A and the tail-end module of FIG. 3C; the head-end module of FIG. 2A and the tail-end module of FIG. 3D; the head-end module of FIG. 2B and the tail-end module of FIG. 3A; the head-end module of FIG. 2B and the tail-end module of FIG. 3; the head-end module of FIG. 2C and the tail-end module of FIG. 3A; the head-end module of FIG. 2D and the tail-end module of FIG. 3A; the head-end module of FIG. 2C and the tail-end module of FIG. 3B; the head-end module of FIG. 2D and the tail-end module of FIG. 3B; the head-end module of FIG. 2B and the tail-end module of FIG. 3C; the head-end module of FIG. 2E and the tail-end module of FIG. 3A; the head-end module of FIG. 2A and the tail-end module of FIG. 3F; the head-end module of FIG. 2B and the tail-end module of FIG. 3D; and the head-end module of FIG. 2C and the tail-end module of FIG. 3C. It should be understood that other combinations of head-end modules 106 and tail-end modules 108 may be used and still fall within the scope of the invention.

Referring to FIG. 1, in operation, the input optical fibers 110 carry light signals that may be, for example, single wavelengths, a band of different wavelengths or a plurality of bands of different wavelengths or any combination thereof. The light signals on the input optical fibers 110 are routed to the output optical fibers 112 via a primary optical path 122. The primary optical path 122 is from the input ports 106A of the head-end modules 106, through the first output ports 106B of the head-end modules 106, through the connections 114, through the primary photonic switch 102, through the connections 116, through the first input ports 108B of the tail-end modules 108 to the output ports 108A of the tail-end modules 108. The paths of the light signals through the head-end modules 106 and the tail-end modules 108 are indicated by dotted lines on each module.

A bridge and roll technique for substituting the second photonic switch 104 for the first photonic switch 102 will now be described with reference to FIGS. 1, 4, 5, 6 and the flowchart of FIG. 7A.

Figure 4:
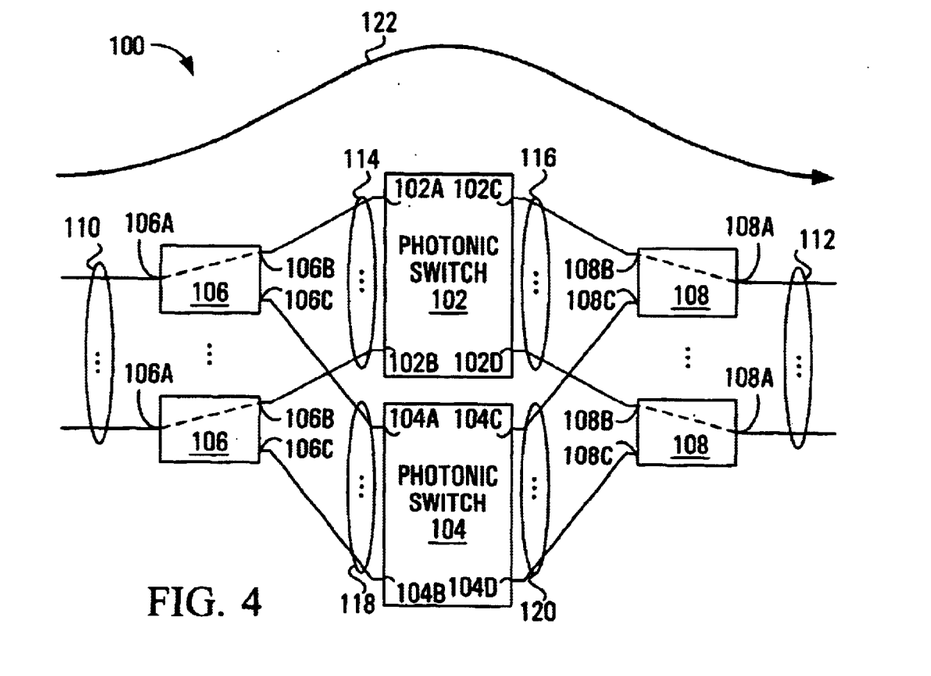
FIGS. 4, 5, and 6 are block diagrams illustrating a bridge and roll operation of the photonic switch system of FIG. 1.
Figure 7A:
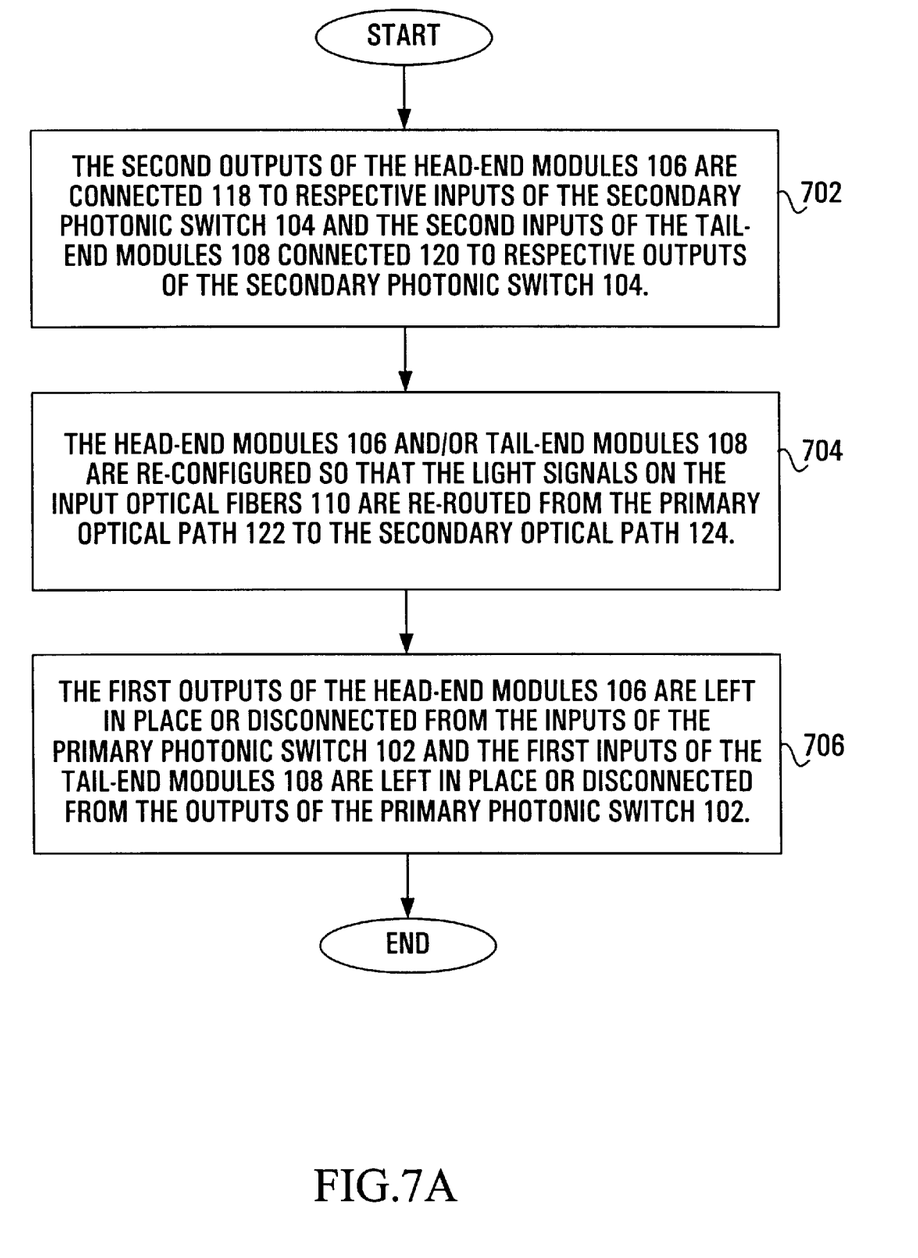
FIG. 7A is a flowchart of the method of performing the bridge and roll operation illustrated in FIGS. 4,5 and 6.

Referring first to FIG. 7A in combination with FIGS. 1 and 4, the second output ports 106C of the head-end modules 106 are connected 118 to respective inputs 104A, 104B of the secondary photonic switch 104. The second input ports 108C of the tail-end modules 108 are connected 120 to respective outputs 104C,104D of the secondary photonic switch 104 (Step 702). This step 702 is known as bridging.

Figure 5:
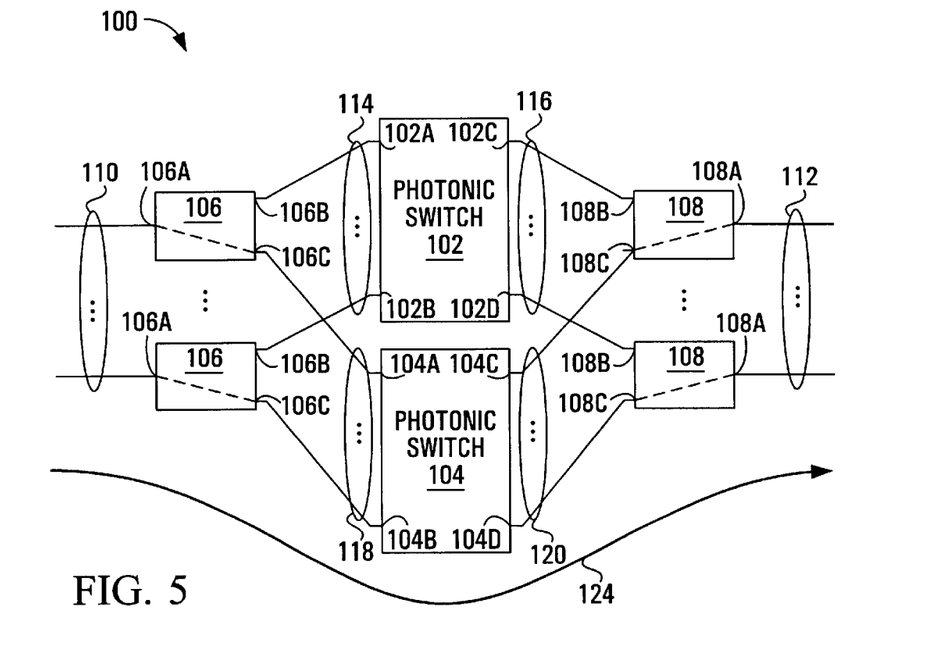

Referring next to FIG. 7A and FIG. 5, the head-end modules 106 are re-configured so that the light signals on the input optical fibers 110 are re-routed from the primary optical path 122 to a secondary optical path 124 (Step 704). This step 704 is known as rolling. It is preferably executed in a time frame that causes only a small (less than 50 ms) interruption to the light signals. The secondary optical path 124 is from the input ports 106A of the head-end modules 106, through the second output ports 106C of the head-end modules 106, through the connections 118, through the secondary photonic switch 104, through the connections 120, through the second input ports 108C of the tail-end modules 108 to the output ports 108A of the tail-end modules 108.

It should be appreciated that the connections 118,120 made in the bridging step 702 may be made at any time before the subsequent rolling step 704 such as during the manufacture of the photonic switch system 100 or after installation of the photonic switch system 100 on a customer's premises.

In an embodiment where the combination of the head-end module of FIG. 2A and the tail-end module of FIG. 3B is used, the step 704 of rolling is accomplished by re-configuring the 2×1 switch 304 so that the light signals at the output 304A of the 2×1 switch 304 are derived from the light signals at the second input 304C instead of the first input 304B. In this embodiment both photonic switches 102,104 receive incoming signals which is useful for monitoring performance of the photonic switches 102,104.

In an embodiment where the combination of the head-end module of FIG. 2A and the tail-end module of FIG. 3C is used, the step 704 of rolling is accomplished by re-configuring the first VOA 308 and the second VOA 310 so that the first VOA 308 has substantially higher attenuation than the second VOA 310 instead of the second VOA 310 having substantially higher attenuation than the first VOA 308. In this embodiment the VOAs 308,310 also enable nodal output level compensation.

In an embodiment where the combination of the head-end module of FIG. 2A and the tail-end module of FIG. 3D is used, the step 704 of rolling is accomplished by re-configuring the first shutter 314 and the second shutter 316 so that the first shutter 314 transmits substantially no light signals from the input 314A of the first shutter 314 to the output 314B of the first shutter 314 and the second shutter 316 transmits substantially all of the light signals from the input 316A of the second shutter 316 to the output 316B of the second shutter instead of the first shutter 314 transmitting substantially all of the light signals from the input 314A of the first shutter 314 to the output 314B of the first shutter 314 and the second shutter 316 transmitting substantially none of the light signals from the input 316A of the second shutter 316 to the output 316B of the second shutter. The shutters 314,316 are less expensive than the VOAs 308,310 of the previous embodiment and have lower loss and higher reliability.

In an embodiment where the combination of the head-end module of FIG. 2B and the tail-end module of FIG. 3A is used, the step 704 of rolling is accomplished by re-configuring the 1×2 switch 204 so that the light signals at the input 204A of the 1×2 switch 204 are routed to the second output 204C instead of the first input 204B. This embodiment has the advantage over the previous three embodiments in that it may reduce back-reflections from a fixed termination.

In an embodiment where the combination of the head-end module of FIG. 2B and the tail-end module of FIG. 3B is used, the step 704 of rolling is accomplished by re-configuring the 1×2 switch 204 so that the light signals at the input 204A of the 1×2 switch 204 are routed to the second output 204C instead of the first input 204B and re-configuring the 2×1 switch 304 so that the light signals at the output 304A of the 2×1 switch 304 are derived from the light signals at the second input 304C instead of the first input 304B. This embodiment has the lowest transmission loss since switches can have lower loss than splitters and combiners. However this combination may be less reliable, and it requires head-end and tail-end switch coordination.

In an embodiment where the combination of the head-end module of FIG. 2C and the tail-end module of FIG. 3A is used, the step 704 of rolling is accomplished by re-configuring the first VOA 208 and the second VOA 210 so that the first VOA 208 has substantially higher attenuation than the second VOA 210 instead of the second VOA 210 having substantially higher attenuation than the first VOA 208. This embodiment is opposite to the embodiment where the combination of the head-end module of FIG. 2A and the tail-end module of FIG. 3C is used. However this embodiment reduces back-reflections from a fixed termination, it also enables nodal input level compensation.

In an embodiment where the combination of the head-end module of FIG. 2D and the tail-end module of FIG. 3A is used, the step 704 of rolling is accomplished by re-configuring the first shutter 214 and the second shutter 216 so that the first shutter 214 transmits substantially no light signals from the input 214A of the first shutter 214 to the output 214B of the first shutter 214 and the second shutter 216 transmits substantially all of the light signals from the input 216A of the second shutter 216 to the output 216B of the second shutter instead of the first shutter 214 transmitting substantially all of the light signals from the input 214A of the first shutter 214 to the output 214B of the first shutter 214 and the second shutter 216 transmitting substantially none of the light signals from the input 216A of the second shutter 216 to the output 216B of the second shutter. This embodiment is opposite to the embodiment where the combination of the head-end module of FIG. 2A and the tail-end module of FIG. 3D is used, however this embodiment reduces back-reflections from a fixed termination.

In an embodiment where the combination of the head-end module of FIG. 2C and the tail-end module of FIG. 3B is used, the step 704 of rolling is accomplished by re-configuring the first VOA 208 and the second VOA 210 so that the first VOA 208 has substantially higher attenuation than the second VOA 210 instead of the second VOA 210 having substantially higher attenuation than the first VOA 208 and re-configuring the 2×1 switch 304 so that the light signals at the output 304A of the 2×1 switch 304 are derived from the light signals at the second input 304C instead of the first input 304B. This embodiment is opposite to the embodiment where the combination of the head-end module of FIG. 2B and the tail-end module of FIG. 3C is used, however it enables nodal input rather than nodal output level compensation. In general, combinations with active head-end and tail-end modules may have less loss but be more unreliable and require coordination.

In an embodiment where the combination of the head-end module of FIG. 2D and the tail-end module of FIG. 3B is used, the step 704 of rolling is accomplished by re-configuring the first shutter 214 and the second shutter 216 so that the first shutter 214 transmits substantially no light signals from the input 214A of the first shutter 214 to the output 214B of the first shutter 214 and the second shutter 216 transmits substantially all of the light signals from the input 216A of the second shutter 216 to the output 216B of the second shutter instead of the first shutter 214 transmitting substantially all of the light signals from the input 214A of the first shutter 214 to the output 214B of the first shutter 214 and the second shutter 216 transmitting substantially none of the light signals from the input 216A of the second shutter 216 to the output 216B of the second shutter; and re-configuring the 2×1 switch 304 so that the light signals at the output 304A of the 2×1 switch 304 are derived from the light signals at the second input 304C instead of the first input 304B. As above, this embodiment with an active head-end and tail-end has lower transmission loss but also lower reliability, and requires coordination.

In an embodiment where the combination of the head-end module of FIG. 2B and the tail-end module of FIG. 3C is used, the step 704 of rolling is accomplished by re-configuring the 1×2 switch 204 so that the light signals at the input 204A of the 1×2 switch 204 are routed to the second output 204C instead of the first input 204B and re-configuring the first VOA 308 and the second VOA 310 so that the first VOA 308 has substantially higher attenuation than the second VOA 310 instead of the second VOA 310 having substantially higher attenuation than the first VOA 308. As above, this embodiment with an active head-end and tail-end has lower transmission loss but also lower reliability, and requires coordination.

In an embodiment where the combination of the head-end module of FIG. 2E and the tail-end module of FIG. 3A is used, the step 704 of rolling is accomplished by re-configuring the 1×2 switch 204 so that the light signals at the input 204A of the 1×2 switch 204 are routed to the second output 204C instead of the first input 204B and re-configuring the first VOA 220 and the second VOA 222 so that the first VOA 220 has substantially higher attenuation than the second VOA 222 instead of the second VOA 222 having substantially higher attenuation than the first VOA 220. This embodiment is similar to the embodiment where the combination of the head-end module of FIG. 2C and the tail-end module of FIG. 3A is used, however this embodiment has lower transmission loss but lower reliability.

In an embodiment where the combination of the head-end module of FIG. 2A and the tail-end module of FIG. 3F is used, the step 704 of rolling is accomplished by re-configuring the 2×2 switch 324 so that the light signals at the first input 324A are transmitted to the second output 324D and the light signals at the second input 324B are transmitted to the first output 324C instead of the light signals at the first input 324A being transmitted to the first output 324C and the light signals at the second input 324B being transmitted to the second output 324D. This embodiment enables the monitoring of one of the photonic switches 102,104.

In an embodiment where the combination of the head-end module of FIG. 2B and the tail-end module of FIG. 3D is used, the step 704 of rolling is accomplished by re-configuring the 1×2 switch 204 so that the light signals at the input 204A of the 1×2 switch 204 are routed to the second output 204C instead of the first input 204B and re-configuring the first shutter 314 and the second shutter 316 so that the first shutter 314 transmits substantially no light signals from the input 314A of the first shutter 314 to the output 314B of the first shutter 314 and the second shutter 316 transmits substantially all of the light signals from the input 316A of the second shutter 316 to the output 316B of the second shutter instead of the first shutter 314 transmitting substantially all of the light signals from the input 314A of the first shutter 314 to the output 314B of the first shutter 314 and the second shutter 316 transmitting substantially none of the light signals from the input 316A of the second shutter 316 to the output 316B of the second shutter. This embodiment is similar to the embodiment where the combination of the head-end module of FIG. 2A and the tail-end module of FIG. 3D is used, however this embodiment has lower transmission loss but lower reliability.

In an embodiment where the combination of the head-end module of FIG. 2C and the tail-end module of FIG. 3C is used, the step 704 of rolling is accomplished by re-configuring the first VOA 208 and the second VOA 210 so that the first VOA 208 has substantially higher attenuation than the second VOA 210 instead of the second VOA 210 having substantially higher attenuation than the first VOA 208 and re-configuring the first VOA 308 and the second VOA 310 so that the first VOA 308 has substantially higher attenuation than the second VOA 310 instead of the second VOA 310 having substantially higher attenuation than the first VOA 308. This combination has the disadvantage of lower reliability, duplicated level control and required coordination.

Figure 6:
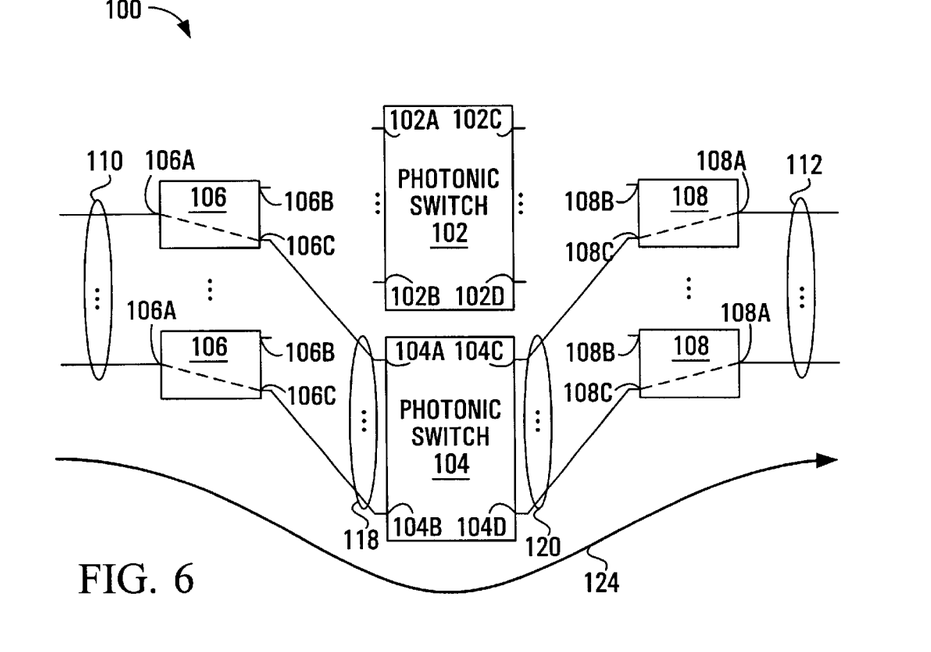

Referring next to FIG. 7A and FIG. 6, the first output ports 106B of the head-end modules 106 are left in place or disconnected from the inputs 102A,102B of the primary photonic switch 102. As well, the first input ports 108B of the tail-end modules 108 are left in place or disconnected from the outputs 102C,102D of the primary photonic switch 102 (Step 706).

Advantageously, the bridge and roll technique described above can be executed in reverse as described with reference to FIGS. 1, 4, 5, 6 and the flowchart of FIG. 7B.

Figure 7B:
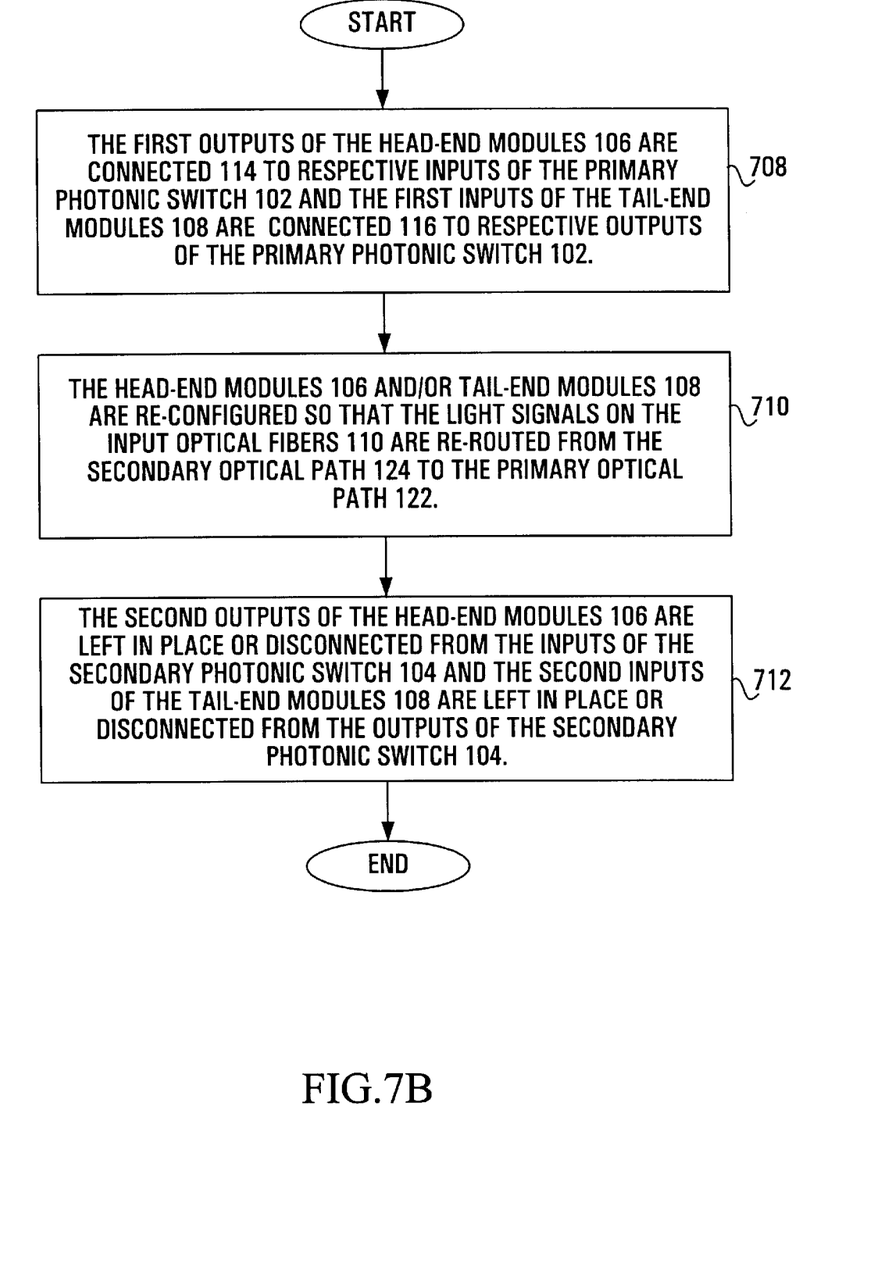
FIG. 7B is a flowchart of the reverse execution of the method of FIG. 7A.

Referring first to FIG. 7B in combination with FIGS. 5 and 6, the first output ports 106B of the head-end modules 106 are already in place or connected 114 to respective inputs 102A,102B of the primary photonic switch 102. The first input ports 108B of the tail-end modules 108 are already in place or connected to 116 respective outputs 102C,102D of the primary photonic switch 102 (Step 708).

Referring next to FIG. 4, the head-end modules 106 are re-configured so that the light signals on the input optical fibers 110 are re-routed from the secondary optical path 124 to the primary optical path 122. (Step 710).

Referring next to FIG. 1, the second output ports 106C of the head-end modules 106 are left in place or disconnected from inputs 104A,104B of the secondary photonic switch 104 and the second input ports 108C of the tail-end modules 108 are left in place or disconnected from the outputs 104C,104D of the secondary photonic switch 104 (Step 712).

An alternative embodiment of the present invention that is especially useful for consolidating multiple light signals onto a single fiber is described with reference to FIGS. 8, 9, 10, 11 and the flowchart of FIG. 12.

Figure 8:
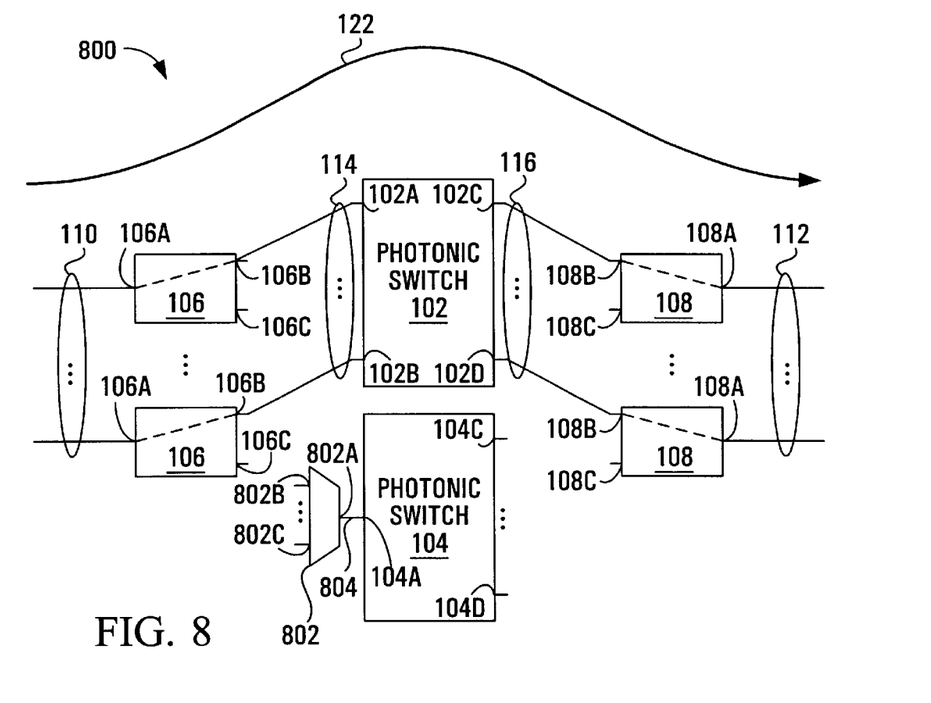
FIGS. 8, 9, 10 and 11 are block diagrams of an alternative embodiment of the present invention.

Referring first to FIG. 8, the photonic switch system 800 of FIG. 8 is identical to the photonic switch system 100 of FIG. 1 except that a multiplexor 802 has been added. The multiplexor 802 has an output 802A and a plurality of inputs 802B,802C where the output 802A is connected 804 to an input 104A of the secondary photonic switch 104.

Figure 9:
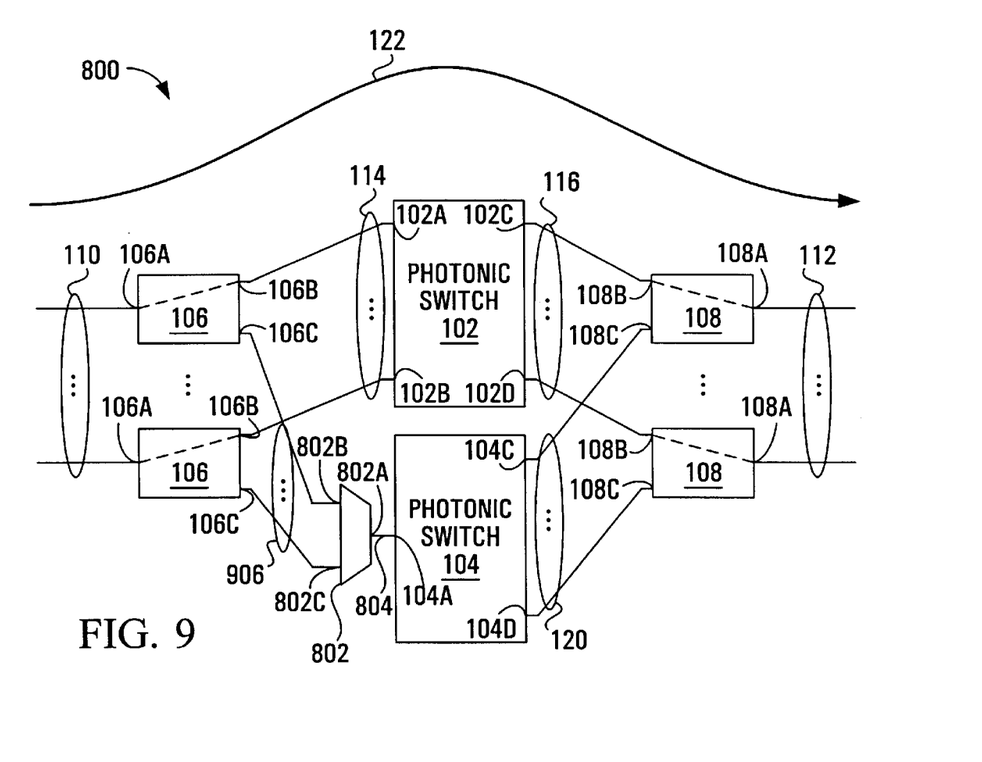

A bridge and roll technique for substituting the second photonic switch 102 will now be described with reference to FIG. 9 in combination with FIG. 12. Firstly, the second output ports 106C of the head-end modules 106 are connected 906 to respective inputs 802B,802C of the multiplexor 802. All of the second output ports 106C are shown connected to inputs 802B,802C of the multiplexor 802 for convenience, however only a subset of the second output ports 106C may be connected to inputs 802B,802C of the multiplexor 802 and still fall within the scope of the invention. The second input ports 108C of the tail-end modules 108 are connected 120 to respective outputs 104C,104D of the secondary photonic switch 104 (Step 1202).

Figure 10:
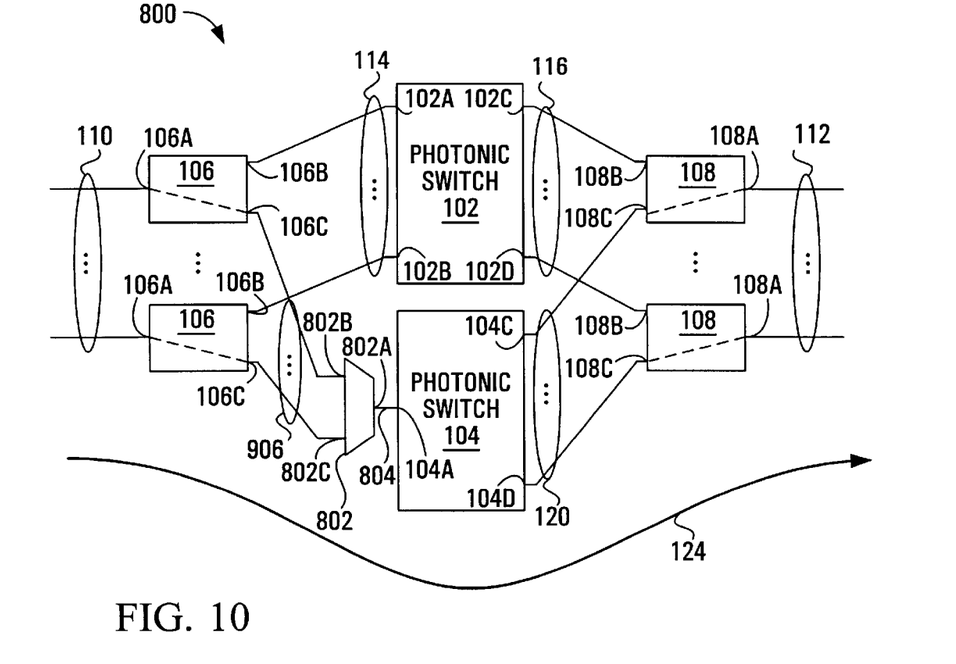
Figure 12:
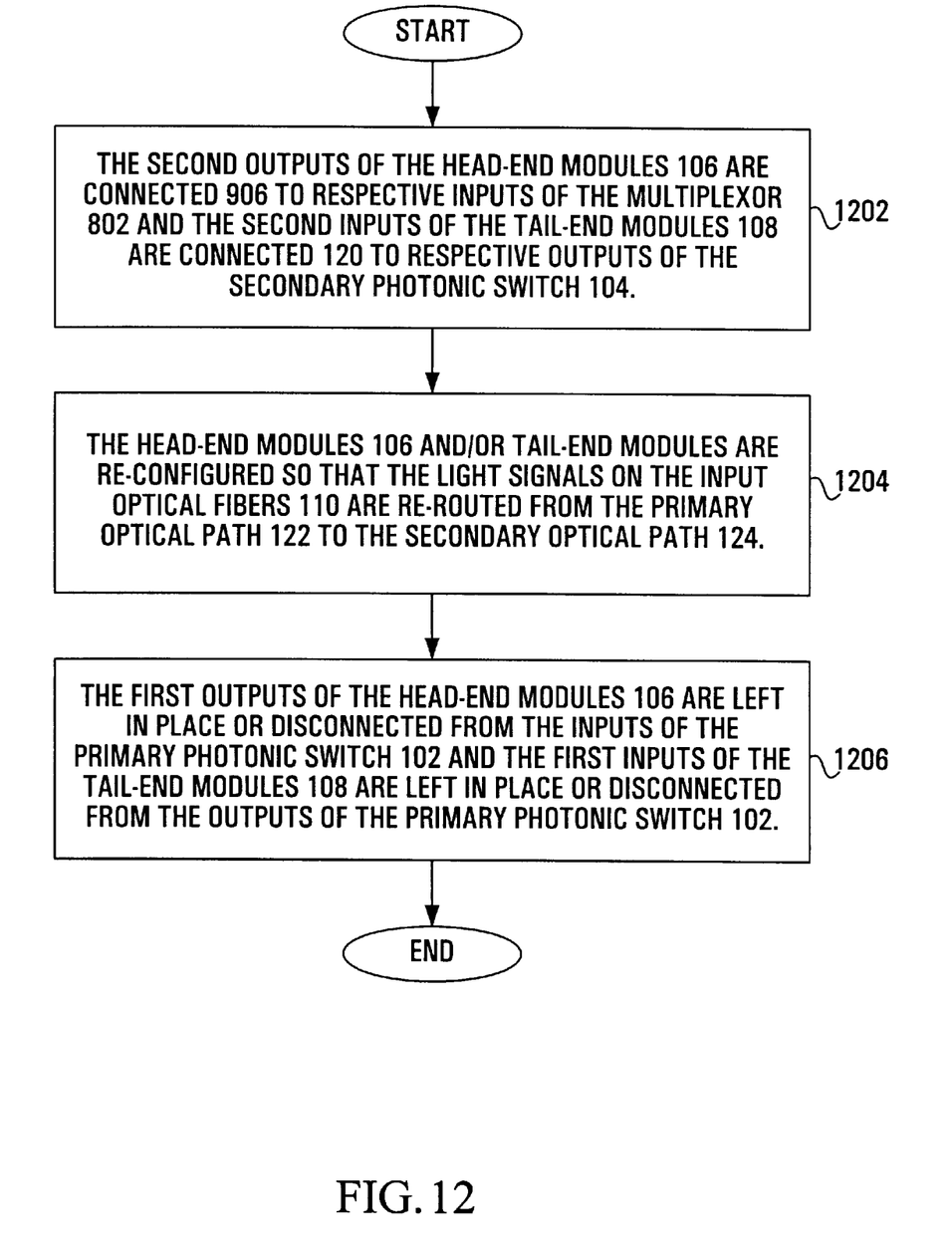
FIG. 12 is a flowchart of the method of performing the bridge and roll operation illustrated in FIGS. 8,9,10 and 11.

Following this bridging and referring next to FIG. 10 and FIG. 12, the head-end modules 106 are re-configured so that the light signals on the input optical fibers 110 are re-routed from the primary optical path 122 to the secondary optical path 124 through to photonic switch 104 (Step 1204).

It should be appreciated that the connections 906,120 made in the bridging step 1202 may be made at any time before the subsequent rolling step 1204 such as during the manufacture of the photonic switch system 800 or after installation of the photonic switch system 800 on a customer's premises. It should also be appreciated the connections 906,120 may be made manually or automatically under remote control.

It should be noted that photonic switch 104 is configured such that the input 104A to which the output 802A of the multiplexer is connected may be selectively connected to any of the outputs 104C, 104D of photonic switch 104.

Figure 11:
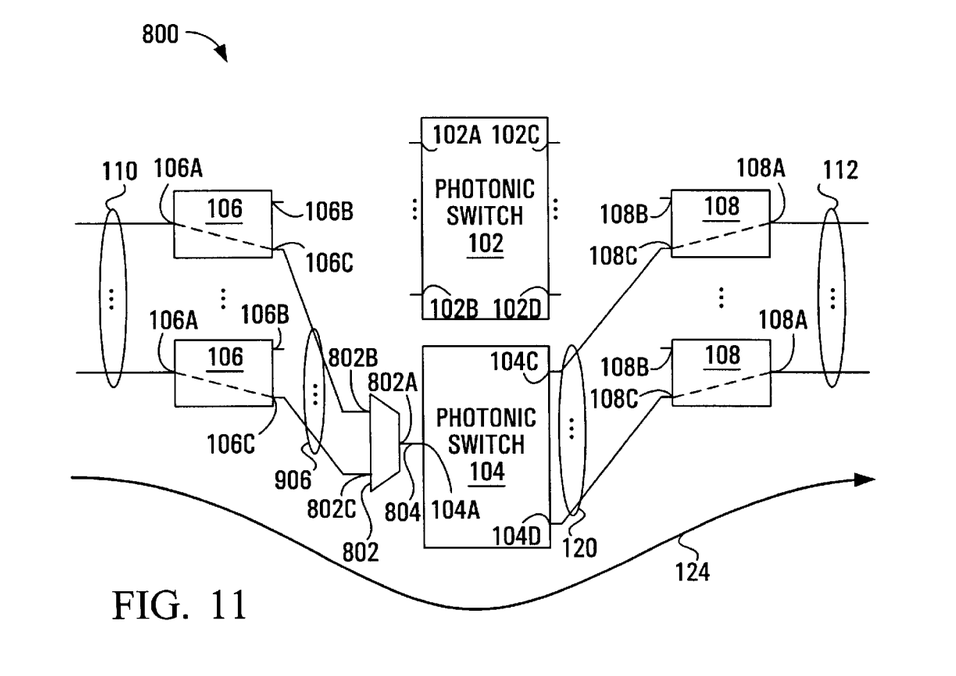

Referring next to FIG. 11 and FIG. 12, the first output ports 106B of the head-end modules 106 are left in place or disconnected from the inputs 102A,102B of the primary photonic switch 102. The first input ports 108B of the tail-end modules 108 are left in place or disconnected from the outputs 102C,102D of the primary photonic switch 102 (Step 1206).

Figure 13:
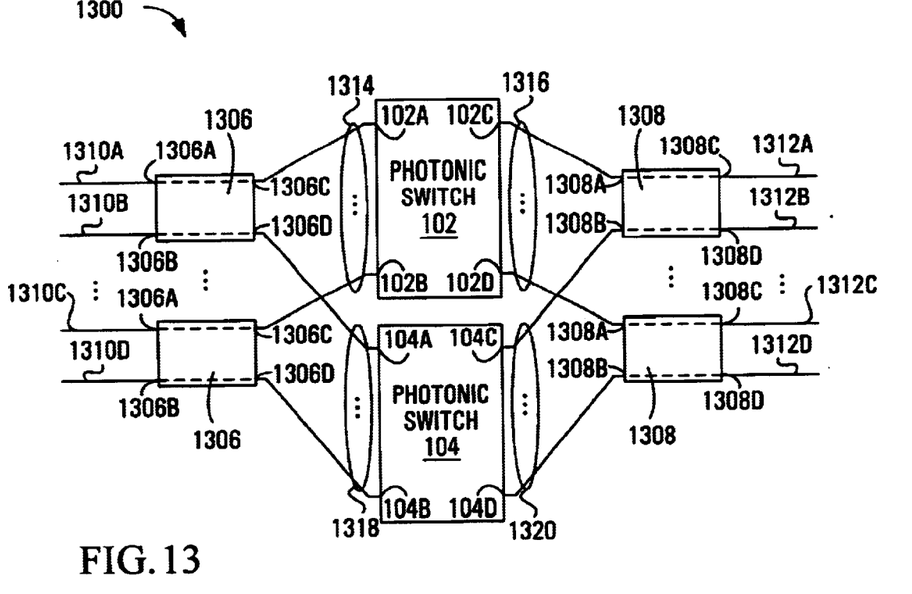
FIGS. 13 and 14 are block diagrams of a further embodiment of the present invention.
Figure 14:
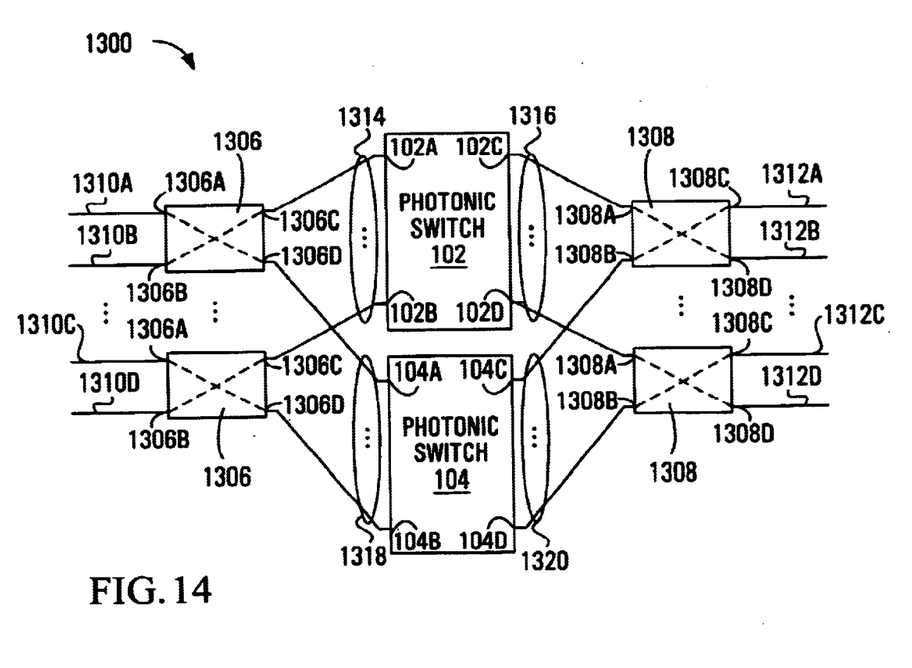

Another embodiment of the present invention is described with reference to FIGS. 13 and 14. Referring first to FIG. 13, a photonic switch system 1300 comprising a plurality of photonic switches shown for convenience as a primary photonic switch 102 having a plurality of inputs 102A,102B and a plurality of outputs 102C,102D, and a secondary photonic switch 104 having a plurality of inputs 104A,104B and a plurality of outputs 104C,104D. The photonic switch system 1300 also comprises: a plurality of head-end 2×2 switches 1306 each having a first input 1306A, a second input 1306B, a first output 1306C and a second output 1306D; and a plurality of tail-end 2×2 switches 1308 each having a first input 1308A, a second input 1308B, a first output 1308C and a second output 1308D. The first outputs 1306A of the head-end 2×2 switches 1306 are connected 1314 to respective inputs 102A,102B of the primary photonic switch 102. The second outputs 1306B of the head-end 2×2 switches 1306 are connected 1318 to respective inputs 104A,104B of the secondary photonic switch 104. The first inputs 1308A of the tail-end 2×2 switches 1308 are connected 1316 to respective outputs 102C,102D of the primary photonic switch 102. The second inputs 1308B of the tail-end 2×2 switches 1308 are connected 1320 to respective outputs 104C,104D of the secondary photonic switch 104. The first inputs 1306A of the head-end 2×2 switches 1306 are optically connectable to input optical fibers 1310A, 1310C that are carrying high-priority traffic. The second inputs 1306B of the head-end 2×2 switches 1306 are optically connectable to input optical fibers 1310B,1310D that are carrying low-priority traffic. The first outputs 1308C of the tail-end 2×2 switches 1308 are optically connectable to output optical fibers 1312A,1312C that are carrying high-priority traffic. The second outputs 1308D of the head-end 2×2 switches 1308 are optically connectable to output optical fibers 1312B,1312D that are carrying low-priority traffic. The high-priority traffic on the input optical fibers 1310A,1310C is routed from the first inputs 1306A of the head-end 2×2 switches 1306, through the first outputs 1306C of the head-end 2×2 switches 1306, through the connections 1314, through the primary photonic switch 102, through the connections 1316, through the first inputs 1308A of the tail-end 2×2 switches 1308 to the first outputs 1308C of the tail-end switches 1308. The low-priority traffic on the input optical fibers 1310B,1310D is routed from the second inputs 1306B of the head-end 2×2 switches 1306, through the second outputs 1306D of the head-end 2×2 switches 1306, through the connections 1318, through the secondary photonic switch 104, through the connections 1320, through the second inputs 1308B of the tail-end 2×2 switches 1312 to the second outputs 1308D of the tail-end switches 1312.

In the arrangement shown in FIG. 13, the primary photonic switch 102 serves to switch all high priority traffic and the secondary photonic switch 104 serves to switch all low priority traffic. When the photonic switch 102 fails or the reliability is unacceptable it is desirable to change the routing so that all high priority traffic is passed through the secondary photonic switch 104 and all low priority traffic is passed through the primary photonic switch 102, the head-end 2×2 switches 1306 and tail-end 2×2 switches 1308 are switched over to the positions shown in FIG. 14. As can be seen, the high-priority traffic is now re-routed from the first inputs 1306A of the head-end 2×2 switches 1306, through the second outputs 1306D of the head-end 2×2 switches 1306, through the connections 1318, through the secondary photonic switch 104, through the connections 1320, through the second inputs 1308B of the tail-end 2×2 switches 1308 to the first outputs 1308C of the tail-end switches 1308; and the low-priority traffic on the input optical fibers 1310B, 1310D is re-routed from the second inputs 1306B of the head-end 2×2 switches 1306, through the first outputs 1306C of the head-end 2×2 switches 1306, through the connections 1314, through the primary photonic switch 102, through the connections 1316, through the first inputs 1308A of the tail-end 2×2 switches 1308 to the second outputs 1308D of the tail-end switches 1308.

While the preferred embodiment of the present invention has been described and illustrated, it will be apparent to persons skilled in the art that numerous modifications and variations are possible. The scope of the invention, therefore, is only to be limited by the claims appended hereto.

What is claimed is:

1. A photonic switch system comprising:
   a first photonic switch having a plurality of inputs and outputs;
   a second photonic switch having a plurality of inputs and outputs;
   a plurality of modules of a first type each having an input port for receiving incoming light signals, a first output port and a second output port, the first output port being connectable to a respective input of the first photonic switch and the second output port being connectable to a respective input of the second photonic switch; and
   a plurality of modules of a second type each having an output port for transmitting outgoing light signals, a first input port and a second input port, the first input port being connectable to a respective output of the first photonic switch and the second output port being connectable to a respective output the second photonic switch,
   wherein each of the first type modules comprises a splitter and/or each of the second type modules comprises a combiner and wherein the first and second type modules are operable in combination to cause the light signal to transit either the first or second photonic switch.

2. The system of claim 1 wherein
   each module of the plurality of a first type comprises a 1:2 splitter and
   each module of the plurality of a second type comprises a 2×1 switch.

3. The system of claim 1 wherein
   each module of the plurality of a first type comprises a 1:2 splitter and
   each module of the plurality of a second type comprises a first variable optical attenuator (VOA), a second VOA and a 2:1 combiner.

4. The system of claim 1 wherein
   each module of the plurality of a first type comprises a 1:2 splitter and
   each module of the plurality of a second type comprises a first shutter, a second shutter and a 2:1 combiner.

5. The system of claim 1 wherein
   each module of the plurality of a first type comprises a 1×2 switch and
   each module of the plurality of a second type comprises an 2:1 combiner.

6. The system of claim 1 wherein the first photonic switch and the second photonic switch are an integral unit.

7. The system of claim 1 wherein
   each module of the plurality of a first type comprises a 1:2 splitter, a first VOA and a second VOA and
   each module of the plurality of a second type comprises a 2:1 combiner.

8. The system of claim 1 wherein
   each module of the plurality of a first type comprises a 1:2 splitter, a first shutter and a second shutter and
   each module of the plurality of a second type comprises a 2:1 combiner.

9. The system of claim 1 wherein
   each module of the plurality of a first type comprises a 1:2 splitter, a first VOA and a second VOA and
   each module of the plurality of a second type comprises a 2×1 switch.

10. The system of claim 1 wherein
    each module of the plurality of a first type comprises a 1:2 splitter, a first shutter and a second shutter and
    each module of the plurality of a second type comprises a 2×1 switch.

11. The system of claim 1 wherein
    each module of the plurality of a first type comprises a 1×2 switch and
    each module of the plurality of a second type comprises a first variable optical attenuator (VOA), a second VOA and a 2:1 combiner.

12. The system of claim 1 wherein
    each module of the plurality of a first type comprises a 1×2 switch, a first VOA and a second VOA and
    each module of the plurality of a second type comprises an 2:1 combiner.

13. The system of claim 1 wherein
    each module of the plurality of a first type comprises a 1:2 splitter and
    each module of the plurality of a second type comprises a 2×2 switch and a performance monitor.

14. The system of claim 1 wherein
each module of the plurality of a first type comprises a 1×2 switch, and
each module of the plurality of a second type comprises a first shutter, a second shutter and a 2:1 combiner.

15. The system of claim 1 wherein
each module of the plurality of a first type comprises a 1:2 splitter, a first VOA and a second VOA and
each module of the plurality of a second type comprises a first VOA, a second VOA and a 2:1 combiner.

16. A photonic switch system comprising:
a first photonic switch having a plurality of inputs and outputs;
a second photonic switch having a plurality of inputs and outputs;
a plurality of modules of a first type each having an input port for receiving incoming light signals, a first output port and a second output port, the first output port being connectable to a respective input of the first photonic switch and the second output port being connectable to a respective input of the second photonic switch;
a plurality of modules of a second type each having a output port for transmitting outgoing light signals, a first input port and a second input port, the first input port being connectable to a respective output of the first photonic switch and the second output port being connectable to a respective output the second photonic switch; and
a multiplexor having a plurality of inputs and an output, the plurality of inputs being connectable to respective second output ports of the module of a second type and the output of the multiplexor being connected to an input of the second photonic switch,
wherein the first and second type modules are operable in combination to cause the light signal to transit either the first or second photonic switch.

17. In the system of claim 16 in which only the first photonic switch is connected into the system such that an optical path is established only through the first photonic switch, a bridge and roll method comprising the steps of:
connecting the second output ports of the plurality of the modules of a first type to a respective input of the multiplexor and connecting a second input port of each module of a second type to a respective output of the second photonic switch;
re-configuring the modules of a first type and the modules of a second type so that the incoming light signals that are received on the input ports of the modules of a first type are re-routed through the multiplexor and through the second photonic switch to an output port of one of the modules of a second type; and
disconnecting the first output port of each module of a first type from the first photonic switch and disconnecting the first input port of each module of a second type from the first photonic switch.

18. A photonic switch system comprising:
a first photonic switch having a plurality of inputs and a plurality of outputs;
a second photonic switch having a plurality of inputs and a plurality of outputs;
a first plurality of 2×2 switches each having a first input and a second input to receive incoming light signals, a first output and a second output, the first output of each of the first plurality of 2×2 switches being connected to a respective input of the first photonic switch and the second output of each of the first plurality of 2×2 switches being connected to a respective input of the second photonic switch; and
a second plurality of 2×2 switches each having a first input and a second input, a first output and a second output for transmitting outgoing light signals, the first input of each of the second plurality of 2×2 switches being connected to a respective output of the first photonic switch and the second input of each of the second plurality of 2×2 switches being connected to a respective output of the second photonic switch,
wherein the first plurality of 2×2 switches and the second plurality of 2×2 switches are re-configured such that the incoming light signals that are received on the firsts inputs of the first plurality of 2×2 switches are routed through the first photonic switch to the first outputs of the second plurality of 2×2 switches to be transmitted as outgoing light signals; and incoming light signals that are received on the second inputs of the first plurality of 2×2 switches are routed through the second photonic switch to the second outputs of the second plurality of 2×2 switches to be transmitted as outgoing light signals.

19. In the system of claim 18 a method for re-routing the incoming light signals that are received on the first inputs of the first plurality of 2×2 switches through the second photonic switch to the first outputs of the second plurality of 2×2 switches, and re-routing the incoming light signals that are received on the second inputs of the first plurality of 2×2 switches through the first photonic switch to the second outputs of the second plurality of 2×2 switches, the method comprising the step of:
re-configuring the first plurality of 2×2 switches and the second plurality of 2×2 switches so that the incoming light signals that are received on the first inputs of the first plurality of 2×2 switches are re-routed through the second photonic switch to the first outputs of the second plurality of 2×2 switches and the incoming light signals that are received on the second inputs of the first plurality of 2×2 switches are re-routed through the first photonic switch to the second outputs of the second plurality of 2×2 switches.

20. A method of performing a bridge and roll operation on incoming optical signals in a photonic switch system having a first photonic switch connected such that an optical path is established only through the first photonic switch, and having a plurality of first type and second type modules and a second photonic switch, the method comprising the steps of:
connecting a second output port of each module of the plurality of modules of the first type to a respective input of the second photonic switch and connecting a second input port of each module of the plurality of the second type to a respective output of the second photonic switch;
re-configuring the modules of the first type and the modules of the second type so that the incoming light signals that are received on the input ports of the modules of the first type are re-routed through the second photonic switch to the output ports of the modules of the second type; and
disconnecting a first output port of each module of the first type from the first photonic switch and disconnecting a first input port of each module of a second type from the first photonic switch.

21. The method of claim 20 further comprising the steps of:
- connecting the first output port of each module of a first type to a respective input of the first photonic switch and connecting the first input port of each module of a second type to a respective output of the first photonic switch;
- re-configuring the modules of the first type and the modules of the second type so that the incoming light signals that are received on the input ports of the modules of the first type are re-routed through the first photonic switch to the output ports of the modules of the second type to be transmitted as outgoing light signals; and
- disconnecting the second output port of each module of a first type from the second photonic switch and disconnecting the first input port of each module of a second type from the second photonic switch.

22. The method of claim 20 wherein the step of re-configuring the modules of the first type and the modules of the second type so that the incoming light signals that are received on the input ports of the modules of the first type are re-routed through the second photonic switch to the output ports of the modules of the second type to be transmitted as outgoing light signals causes an interruption of less than 50 milliseconds in the outgoing light signals.

* * * * *

UNITED STATES PATENT AND TRADEMARK OFFICE
CERTIFICATE OF CORRECTION

PATENT NO.    : 6,643,423 B2
DATED         : November 4, 2003
INVENTOR(S)   : John G. Gruber et al.

It is certified that error appears in the above-identified patent and that said Letters Patent is hereby corrected as shown below:

<u>Column 13,</u>
Line 23, change "having a" to -- having an --.

Signed and Sealed this

Thirtieth Day of March, 2004

JON W. DUDAS
*Acting Director of the United States Patent and Trademark Office*